United States Patent

[11] 3,600,961

| [72] | Inventors | Manfred Rattunde;<br>Otto Dittrich, both of Bad Homburg, Germany |
|---|---|---|
| [21] | Appl. No. | 887,009 |
| [22] | Filed | Dec. 22, 1969 |
| [45] | Patented | Aug. 24, 1971 |
| [73] | Assignee | Reimers Getriebe A. G.<br>Zug, Switzerland |
| [32] | Priority | Dec. 24, 1970 |
| [33] | | Germany |
| [31] | | P 18 16 951.2 |

[54] INFINITELY VARIABLE CONE PULLEY TRANSMISSION
11 Claims, 4 Drawing Figs.

[52] U.S. Cl. .................................................... 74/230.17F, 74/230.17 M
[51] Int. Cl. .................................................... F16h 55/22
[50] Field of Search............................................ 74/865, 230.17 F

[56] References Cited
UNITED STATES PATENTS

| 2,891,213 | 6/1959 | Kern | 74/230.17 (F) X |
| 3,052,132 | 9/1962 | Dittrich et al. | 74/230.17 (F) |
| 3,110,189 | 11/1963 | Stever | 74/230.17 (F) |
| 3,368,426 | 2/1968 | Karig et al. | 74/865 |
| 3,395,586 | 8/1968 | Kirchner | 74/230.17 (F) |

*Primary Examiner*—Leonard H. Gerin
*Attorney*—Jennings Bailey, Jr.

ABSTRACT: A fully hydraulic control mechanism for an infinitely variable cone pulley transmission in which the axially movable conical disk of each pulley is pressed against an endless belt or chain running between the pulleys with a different contact pressure than the corresponding disk of the other pulley. The control mechanism acts at the same time upon the axially movable disks on the driving and driven shafts of the transmission, and the contact pressure of all disks is load responsive.

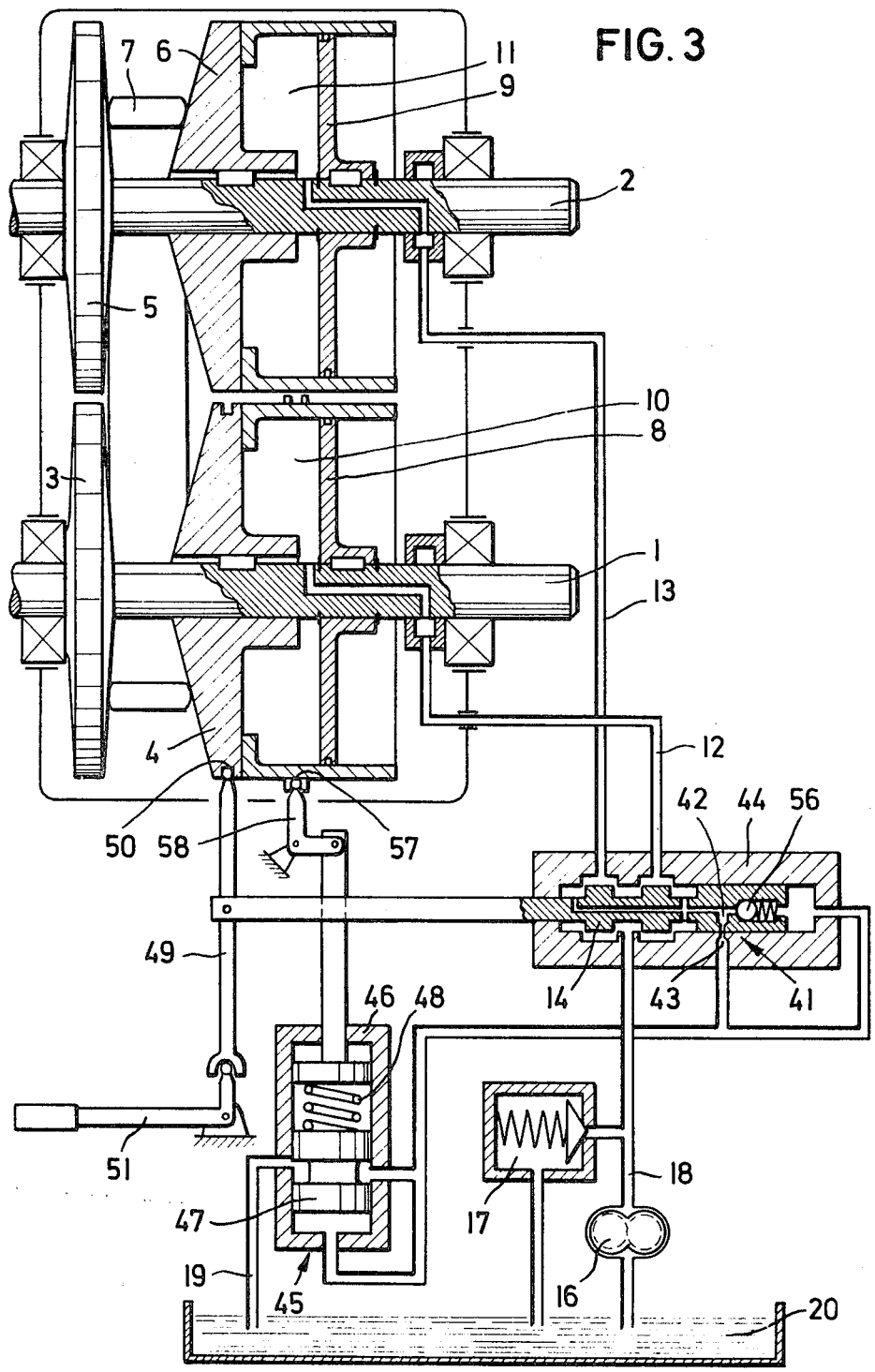

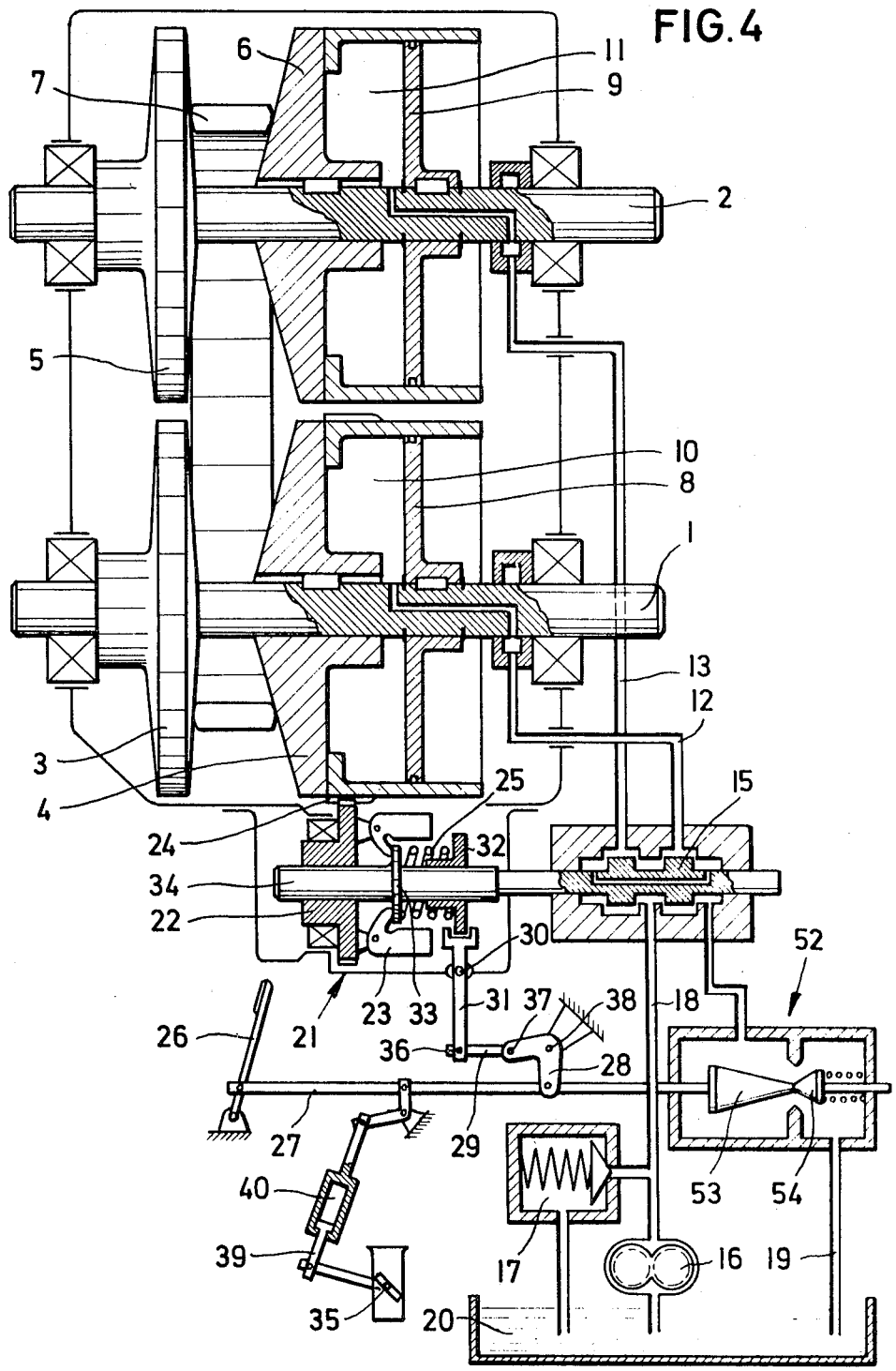

INFINITELY VARIABLE CONE PULLEY TRANSMISSION

BACKGROUND OF THE INVENTION

1. Field of the Invention

The present invention relates to an infinitely variable cone pulley transmission which comprises associated pairs of conical disks on the driving and driven sides of the transmission, and an endless transmitting element such as a belt or chain running between the two pairs of conical pulley disks. One disk of each pair is slidable in the axial direction on its shaft relative to the other disk and is designed so as to form a rotatable hydraulic cylinder containing a piston which is rigidly connected to this shaft. These conical disks at both sides of the transmission are pressed against the transmitting elements with contact pressures which solely depend upon the hydraulic pressure in the cylinders which is produced automatically in a manner so as to be directly responsive to the load which is exerted upon the transmission. This transmission further comprises a control element for maintaining and varying the speed ratio of the transmission, a distributing slide valve which is provided with four control edges and is acted upon by the control element and adapted to receive a pressure fluid such as oil from a suitable source under pressure and to distribute this pressure fluid to the hydraulic cylinders, and an adjustable throttle valve in the return line of the pressure fluid which flows past the outer control edges of the slide valve with the pressure which prevails at the driven side of the transmission.

2. The Prior Art

The control element of a transmission of this type as disclosed by the U.S. Pat. No. 3,451,283 and the copending British application No. 36,680/67 consists of a control lever which is pivotably connected to the slide valve with four control edges and permits this valve to be arbitrarily adjusted, for example, by hand, for varying the speed ratio of the transmission and also to be adjusted by one of the axially slidable conical disks in proportion to the distances of its axial movements. For this purpose, one end of the control lever is connected to an actuating element for effecting the manual adjustments, while its other end engages into a peripheral groove in the outer surface of the axially slidable conical disk.

While such a control element is very suitable especially when the drive unit is of a type which rotates at a constant speed, it is advisable to employ a control element of a different construction if the power output and the speed of the drive unit are variable. Such a control element as disclosed, for example, by the French Pat. No. 1,425,189 in connection with an infinitely variable cone pulley transmission in which the contact pressures of the conical disks at the driving and driven sides of the transmission upon the endless transmitting element are produced solely by mechanical means, consists of an output control lever for the drive unit which acts upon a governor which determines the speed ratio of the transmission and is also controlled by the variable driving speed of the drive unit.

A transmission of the type as first described above is further provided with a control or biasing valve which is inserted into the return line of the pressure fluid which flows through this line under the hydraulic pressure prevailing at the driven side of the transmission. The initial tension of this biasing valve is variable in response to the hydraulic pressure prevailing at the driving side of the transmission. If in such a transmission the load is increased, for example, on its driven side, this has the effect, in view of the general law of such transmissions that the transmitting element always exerts a greater spreading force upon the driving disks than upon the driven disks, that the conical disk which is axially slidable at the driving side yields under the spreading force of the transmitting element because the hydraulically produced contact pressure of this disk against the transmitting element is insufficient to balance this spreading force. At the same time, the axially slidable conical disk at the driven side of the transmission moves in the direction toward the transmitting element and the speed ratio of the transmission is therefore changed so that its driven shaft will run at a lower speed. This operation has the result that by the action of the control element and the slide valve with four control edges which is pivotably connected thereto the hydraulic pressure will be increased at the driving side of the transmission. This increased hydraulic pressure at the driving side further causes by means of the biasing valve an increase of the hydraulic pressure at the driven side and thus at the same time an increase of the pressure ratio of both sides of the transmission. This transient pressure variation comes to a stop when the slide valve is in a position in which in operative association with the biasing valve the contact pressures which are exerted by the two pairs of conical disks upon the transmitting element are in a state of balance with the spreading forces which are exerted by the transmitting element upon these disks.

These adjusting operations proceed, however, in the reverse direction when the load upon the driven side of the transmission decreases and thus also the torque which is to be transmitted by the transmission. All of these adjusting proceedings have, however, in common that an increase or decrease of the hydraulic pressure at the driven side of the transmission by means of the biasing valve can always occur only when a corresponding increase or decrease of the hydraulic pressure has already occurred at the driving side as the result of the adjustment of the slide valve. Stated in different words, this means that a variation of the torque which is conducted through the transmission cannot simultaneously exert any influence upon the height of the hydraulic pressure at the driving and driven sides of the transmission so as to effect a very quick adjustment of the latter to the new load conditions. This leads to a certain sluggishness of the known types of fully hydraulic contact-pressure producing systems which is especially of disadvantage if the changes in the torque occur frequently or in quick succession.

SUMMARY OF THE INVENTION

It is the principal object of the present invention to provide an infinitely variable cone pulley transmission in which the contact pressures for applying the conical disks of the driving and driven sides of the transmission against the endless transmitting element are produced fully hydraulically, and which overcomes the disadvantages of the transmissions of this type as previously disclosed. The transmission according to the present invention is therefore to be designed so as to fulfill the requirement that the generation of the hydraulic contact pressure which is required at the driven side of the transmission is no longer dependent upon the hydraulic pressure which prevails at its driving side. It is a further object of the invention to design this transmission in such a manner that the ratio between the contact pressures on the driving and driven sides of the transmission may also be controlled so as to be in relation to the speed ratio to which the transmission is adjusted.

For attaining these objects, the present invention provides an infinitely variable cone pulley transmission of the type as first referred to herein, which, however, is designed so that the throttle valve and the distributing slide valve which is provided with four control edges will be controlled simultaneously by the control element. The throttle valve may for this purpose either be connected to the distributing slide valve so as to be movable proportionally or it may also be positively connected to this slide valve.

By designing the transmission in accordance with the invention the result is attained that any change of the operating conditions of this transmission, that is, any arbitrary variation of its speed ratio, any variation of the speed or the power output of the drive unit, or any variation of the load acting upon the driving side of the transmission and thus any variation of the torque which is to be transmitted by the transmission, will react directly upon the slide valve as well as upon the throttle valve so that there will be no longer any interval between the operation of the slide valve and that of the throttle valve.

According to one feature of the invention, the throttle valve may be formed by providing the slide valve with a radial bore and the housing of the slide valve with a corresponding bore which extends coaxially to and in communication with the first bore when the slide valve is in its neutral position. Thus, when the slide valve is shifted, the two bores will shift relative to each other so that the throttling passage between them will be restricted. An additional feature of the invention consists in providing a check valve one side of which communicates through an axial bore in the end of the slide valve with the radial bore in this valve, while its other side communicates with the return line for the pressure fluid. Such a construction of the throttle valve has the advantage of being very simple and of requiring very little space and it may be employed when it is merely necessary that changes in the operating conditions of the transmission will react without delay upon the hydraulic pressure on the driving side as well as on the driven side of the transmission.

In the event that the control element is provided in the form of a control lever which is pivotably connected to the slide valve and adapted to be moved so as to vary the speed ration of the transmission arbitrarily and also to be moved by one of the axially slidable conical disks for maintaining the speed ratio as adjusted, it is another feature of the invention to provide a second throttle valve behind and in series with the first throttle valve and, for example, in the form of a conical valve or a slide valve with one control edge which is adjustable by and in proportion with the movement of one of the axially slidable conical disks. In this manner, the invention permits the ratio between the contact pressures of the conical disks upon the transmitting element at the driving and driven sides of the transmission to be controlled also in response to the particular speed ratio since each possible speed-ratio position of the transmission is associated with a particular adjustment of the second throttle valve.

BRIEF DESCRIPTION OF THE DRAWINGS

These and additional features and advantages of the present invention will become further apparent from the following detailed description thereof which is to be read with reference to the accompanying drawings which show several embodiments of the new infinitely variable cone pulley transmission, largely in cross section and partly diagrammatically simplified. In these drawings.

FIG. 3 shows the transmission according to FIG. 2, but provided for being employed with a drive unit which runs with a constant speed; while FIG. 4 shows another transmission according to the invention which may be employed for a drive unit which has a variable power output and a variable speed and is provided with a throttle valve according to a third embodiment of the invention.

DESCRIPTION OF THE PREFERRED EMBODIMENTS

Figure 1:
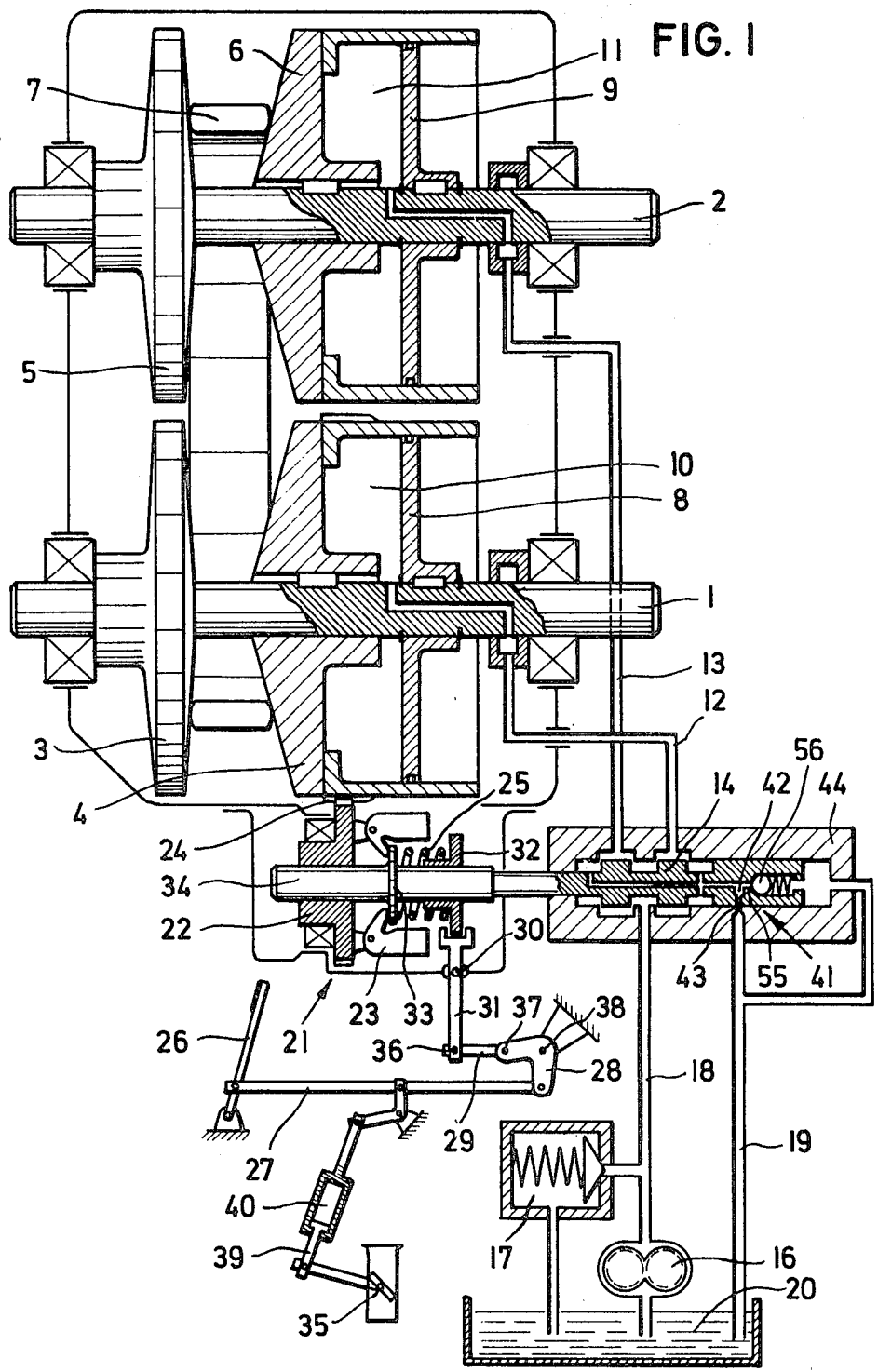
FIG. 1 shows a transmission according to the invention which is intended for a drive unit which has a variable power output and a variable speed and is provided with a throttle valve according to a first embodiment of the invention.

For an easier understanding and comparison of the different embodiments of the invention, all those parts of these embodiments which carry out similar functions are designated in the drawings and are referred to in the following description by the same reference numerals. Thus, each of the transmissions as illustrated in the drawings comprises a drive shaft 1 and a driven shaft 2. Drive shaft 1 carries a pair of conical disks 3 and 4 and the driven shaft 2 a pair of conical disks 5 and 6, and these two pairs of conical disks are connected by an endless transmitting element 7 such as a belt or chain. Disks 4 and 6 are designed in the form of hydraulic cylinders each of which is movable in the axial direction along shaft 1 or 2, respectively, and is associated with a piston 8 or 9 which is rigidly secured to the respective shaft so that between disk 4 and piston 8 and also between disk 6 and piston 9 a pressure chamber 10 or 11 is formed into which oil under pressure may be conducted through a conduit 12 or 13, respectively, so as to produce the required contact pressure of the two pairs of disks upon the transmitting element 7.

Conduits 12 and 13 are connected to a distributing slide valve 14 or 15 according to FIGS. 1 and 3 or FIGS. 2 and 4, respectively, which is provided with four control edges and distributes the oil which is supplied to it by a pump 16 in accordance with the position to which it is adjusted to the conduits 12 and 13. For safety reasons, a check valve 17 which is connected to the conduit 18 connecting the pump 16 with slide valve 14 or 15 limits the maximum oil pressure which may occur in the slide valve and thus also the maximum power which may be transmitted by the transmission. The excess of oil which is supplied by pump 16 may flow from the outer control edges of slide valve 14 or 15 and through a return line 19, for example, to the sump 20 to which the suction side of pump 16 is also connected.

Figure 2:
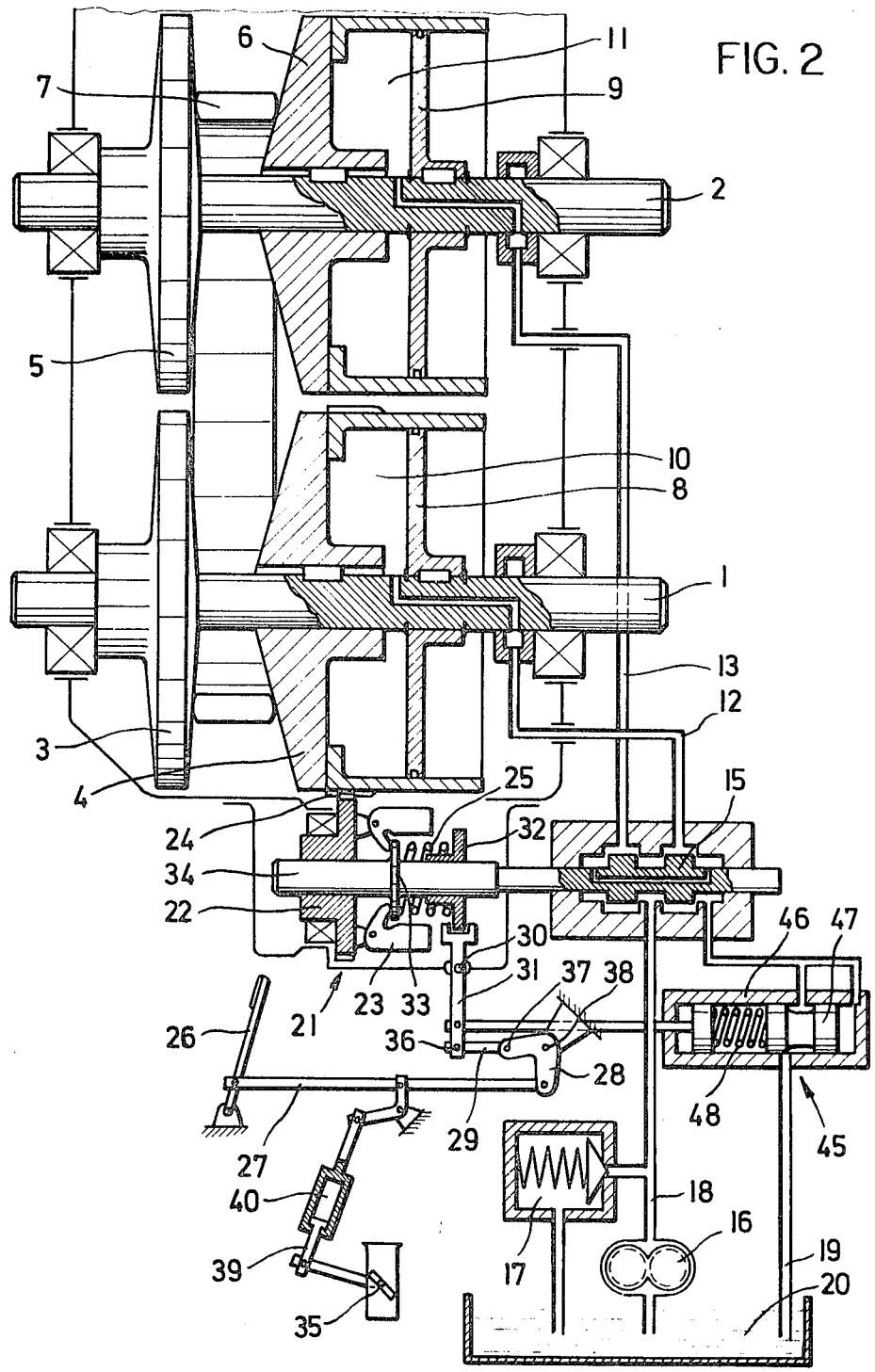
FIG. 2 shows the transmission according to FIG. 1, but provided with a throttle valve according to a modification of the invention.

Slide valve 14 or 15 of either of the transmissions according to FIGS. 1, 2 and 4 which may be employed, for example, in a drive unit of a motor vehicle is connected to a speed governor 21 the flyweight members 23 of which are pivotably mounted on a gear wheel 22 which is rotatable on the shaft 34 of slide valve 14 or 15 but not slidable in its axial direction. Since the teeth of gear wheel 22 mesh with gear teeth 24 on the cylinder on the conical disk 4, the flyweight members 23 are influenced by the particular output of the drive unit as adjusted, for example, of an internal combustion engine. For this purpose, the accelerator 26 (control element) of the engine (not shown) is connected by a rod 27, a pivotable bell crank 28, and a tie rod 29 to the free end of a two-armed lever 31 which is pivotably mounted about an axis 30 and adapted by engaging with a flange 32 on a bushing on the slide valve shaft 34 to press a spring 25 more or less against a flange 33 on shaft 34 against the action of the flyweight members 23.

It is a characteristic of infinitely variable cone pulley transmissions of the known types that in the event that the direction of the torque changes which is transmitted by them, i.e. when the normally driven shaft 2 becomes the driving shaft, their speed ratio as adjusted no longer remains the same but the speed at their then driven side considerably increases. This is due to the fact that the transmitting element 7 exerts upon the driving conical disks a spreading force which is about equal to twice the size of that which this element exerts upon the conical disk at the driven side of the transmission. Such a reversal of the direction of the torque occurs, however, very frequently in the transmissions of motor vehicles when the engine is to be employed for decelerating the vehicle rather than for driving the same. Such an undesirable adjustment of the transmission to high driven speeds may be counteracted by using the accelerator 26 to simulate a load on the governor 21 without, however, opening the throttle valve 35 in the carburetor of the engine. This may be effected in transmissions similar to those as shown in FIGS. 1, 2 and 4, for example, in accordance with the U.S. Pat. No. 3,368,426 and the corresponding British Pat. No. 1,096,469 in such a manner that, when the accelerator 26 is in the neutral position as illustrated, the pivot points 36 and 37 of tie rod 29 and the pivot point 38 of bellcrank 28 are in straight alignment with each other, and that the accelerator 26 may be further retracted from its neutral position. A forward as well as a rearward movement of the accelerator 26 from its neutral position will then result in a pivoting movement of the two-armed lever 31 in the same direction about its pivot point 30 and thus to an increased compression of spring 25. In order to prevent the carburetor of the engine from being affected when the accelerator 26 is retracted beyond its neutral position, the connecting rod 39 leading to the throttle valve 35 is divided and provided between its two sections with a device 40 which permits these two sections of rod 39 to move toward each other when the accelerator 26 is so retracted.

For controlling the hydraulic pressure which prevails in pressure chamber 11 at the driven side of the transmission as illustrated in FIG. 1 and for thus also controlling the pressure level of both sides of the transmission, a throttle valve 41 is connected into the return line of the oil flowing from the outer control edges of slide valve 14. This throttle valve 41 is formed of a radial bore 42 in slide valve 14 and of a bore 43 in the housing 44 of this valve which is in axial alignment with and communicates with bore 42 when slide valve 14 is in its neutral position as illustrated. Such a throttle valve 41 may not only be very easily and inexpensively produced, but especially because of its dependency upon the operative position of slide valve 14 it has the advantage that every control impulse which is derived from the action of the governor 21 will act immediately not only upon the hydraulic pressure in pressure chamber 10 at the driving side but also upon the hydraulic pressure in pressure chamber 11 at the driven side of the transmission. Thus, if any changes occur in the operating conditions of the transmission, the required contact pressures of the two pairs of conical disks upon the transmitting element 7 will be very quickly and accurately adjusted in accordance with these changes. This will become more clearly evident from the following operating examples.

If the transmission is in its neutral position as illustrated in FIG. 1 and the vehicle is to be suddenly accelerated, the accelerator 26 is depressed and thus pivoted toward the right with the result that the flanged bushing 32 and thus also the spring 25 and valve shaft 34 will be shifted for a short distance toward the left so that slide valve 14 will also be slightly shifted toward the left from its central position as illustrated. This movement of shaft 34 and its flange 33 toward the left immediately causes the free ends of the flyweight members 23 to be pivoted slightly in the direction toward shaft 34. Because of the very steep characteristic of slide valve 14, its small movement toward the left has the result that the hydraulic pressure in chamber 10 will drop considerably since the cross-sectional passage for the flow of oil through the slide valve 14 to the conduit 12 will be reduced, while the hydraulic pressure in chamber 11 increases since the cross-sectional passage for the flow of oil to conduit 13 will be enlarged. The conical disk 6 thereupon moves toward the left and disk 4 toward the right so that the transmission is adjusted toward lower driven speeds which continues until due to the simultaneous increase of the speed of drive shaft 1 and thus also of the engine the flyweight members 23 have shifted the slide valve 14 beyond its central position so far toward the right that by the increase of the hydraulic pressure in conduit 12 and in chamber 10, the yielding movement of the conical disk 4 is stopped. When slide valve 14 has reached this position, the passage through the throttle valve 41 will have such a cross-sectional size that the amounts of oil flowing off through this throttle valve under the pressure prevailing in conduit 13 and in chamber 11 will be properly adjusted to produce the required contact pressure of the conical disks at the driven side of the transmission against the transmitting element 7.

Because of the steep characteristic of slide valve 14, the adjusting operation as previously described proceeds within a very short length of time since the transmission will almost immediately respond even to very small axial movements of this slide valve so as to vary the speed ratio. If therefore the accelerator 26 is depressed so as to accelerate the vehicle, this movement will almost simultaneously result in a change of the speed ratio of the transmission since the state of balance between the force of spring 25 acting upon one side of flange 33 and the axial force which is exerted upon the other side of this flange only needs to be slightly displaced so as to effect a corresponding small axial movement of slide valve 14 toward the right or left.

However, when the accelerator 26 is fully depressed and the transmission is temporarily in the position in which the transmitting element 7 runs with a small radius between the conical disks on shaft 1 and with a large radius between those on shaft 2, the engine will run at a speed which substantially corresponds to its maximum output and which is predetermined by the strength of spring 25. When the speed of the vehicle then increases, the engine has always the tendency to increase its speed which, however, causes the flyweight members 25 to shift the slide valve 14 continuously toward the right with the result that by the corresponding increase of the hydraulic pressure in chamber 10 and the increase in speed of the vehicle the output speed of the transmission will also increase until at the end of the acceleration the power which is required on the driven shaft 2 to overcome the driving resistance of the vehicle will be equal to the power which the engine transmits to shaft 1. During this adjusting operation the speed of the engine and thus also the speed of shaft 1 will increase only slightly.

When the driving resistance of the vehicle increases, for example, when driving uphill, and when the accelerator 26 is depressed, for example, to the middle of the full distance of its possible movement from its neutral position and is maintained in this depressed position, the engine and thus also the shaft 1 and the governor 21 will drop to a lower speed. The flyweight members 23 will then pivot under the action of spring 25 toward shaft 34 with the result that slide valve 14 will be shifted slightly toward the left and the hydraulic pressure will increase at the driven side of the transmission so that its speed will also decrease at this side. This adjusting operation will again be terminated when a state of balance is reached between the particular output of the engine as adjusted and the power which is required on the driven shaft 2 and when the engine and shaft 1 therefore have no longer the tendency to decrease in speed.

If, however, when the driving resistance of the vehicle increases because of a steeper uphill drive and the accelerator 26 is further depressed so that the output of the engine will be increased to the same extent as required in order to attain on the driven shaft 2 the necessary power for overcoming the increased driving resistance, this operation will practically not result in any variation of the speed ratio of the transmission but only in a small increase in the speed of the engine the engine and of shaft 1 and thus also only in a small movement of slide valve 14 toward the right which causes the hydraulic pressure to be increased in conduit 12 and in pressure chamber 11. It is therefore evident from the above example of the operation of the transmission according to FIG. 1 that the contact pressures of the conical disks upon the transmitting element 7 are controlled at both sides of the transmission in accordance with the actually occurring load and that therefore, when the power increases which is transmitted by this transmission and therefore also the load increases to which the transmission is subjected, while at the same time the speed ratio of the transmission remains substantially interchanged, the contact pressures of the conical disks will be likewise increased on the driving and driven sides of the transmission.

If, however, the speed of the vehicle is to be reduced by employing the engine as a brake, this cannot be attained without any additional means since in this case shaft 2 will become the driving shaft and shaft 1 the driven shaft with the result that the transmitting element 7 will then exert a greater spreading force upon the conical disks 3 and 4 and will therefore run with a small radius between the disks 5 and 6 on shaft 2 and with a large radius between disks 3 and 4 on shaft 1 since the pressure chambers 10 and 11 will then not contain the necessary hydraulic pressures for opposing the spreading forces which then occur in accordance with the reversed ratio.

This deficiency may be overcome by employing the accelerator 26 so as to simulate the occurrence of a load on the governor 21 without, however, changing the idling power of the engine. This may be attained with the transmission according to FIG. 1 by retracting the accelerator 26 beyond its neutral position as illustrated which will likewise cause the flanged bushing 32 to be shifted toward the left so that the compression of spring 25 will be increased. Due to the fact that by the provision of the device 40 the two sections of the connecting rod 39 are then slidable toward each other, the position of the throttle valve 35 will not be changed by such a retraction of the accelerator 26 and therefore the output of power of the engine will also not be changed.

When bushing 32 is thus shifted toward the left, spring 25 will also shift slide valve 14 slightly toward the left of its neutral position as illustrated so that the hydraulic pressure in chamber 11 will be increased, while the pressure in chamber 10 will be reduced. The conical disk 6 then moves toward the left and disk 4 toward the right so that the speed of shaft 1 increases until the resulting increase of the speed of governor 21 and the force which is exerted by the flyweight members 23 upon flange 33 balances the force which is exerted by spring 25 upon the other side of this flange. In this balanced condition, slide valve 14 will be in a position in which it is shifted toward the left of its neutral position as illustrated which is due to the fact that shaft 2 then acts as the driving shaft and shaft 1 as the driven shaft.

Since in the event of a sudden strong movement of slide valve 14 the throttle valve 41 will be nearly or entirely closed, slide valve 14 is provided with an axial bore 55 through which the oil may bypass the throttle valve 41 and flow from slide valve 14 to a check valve 56 which is provided for safety reasons for limiting the maximum hydraulic pressure which may be produced at the driven side of the transmission.

The transmission as illustrated in FIG. 2 differs from the transmission according to FIG. 1 by being provided with a throttle valve of a modified design and arrangement. This throttle valve which is designated generally by the numeral 45 and is again inserted in the return line of the oil flowing from the outer control edges of slide valve 15 under the hydraulic pressure prevailing in the pressure cylinder 11 of the driven side of the transmission consists of a housing 46 in which a slide valve 47 with one control edge is slidable in its axial direction. The end surfaces of this slide valve 47 form piston surfaces one of which is acted upon by the accelerator 26 via an intermediate compression spring 48, while the other piston surface is acted upon by the hydraulic pressure prevailing in the driven side of the transmission.

The difference between the effect of the throttle valve 45 according to FIG. 2 and the effect of the throttle valve 41 according to FIG. 1 consists essentially in the fact that valve 45 is always immediately adjusted to the hydraulic pressure occurring in the driven side of the transmission which, when the output of the engine is changed by means of the accelerator 26, corresponds to the new balanced condition of the transmission which is in accordance with this changed output. Thus, if the pressure upon spring 48 is increased, for example, when the accelerator 26 is depressed, slide valve 47 will be shifted toward the right and thereby causes the flow of oil through the return line 19 to be throttled. When this throttling effect has reached the desired value, the now increased hydraulic pressure of the driven side of the transmission which acts upon the slide valve 47 will counterbalance the increased pressure of spring 48.

FIG. 3 illustrates a modification of the transmissions as shown in FIGS. 1 and 2 which is provided for those cases in which, while the engine is running at a constant speed, the speed of the driven shaft should be variable. Those parts in FIG. 3 the construction of which has already been described are again identified by the same numerals as previously used with reference to FIGS. 1 and 2. For maintaining the speed ratio of the transmission to which the latter has been adjusted or for arbitrarily varying this ratio, a control lever 49 is provided one end of which engages into a peripheral groove 50 in the conical disk 4 and thus traces or senses the particular speed ratio to which the transmission is adjusted, while the other end of control lever 49 is adjustable to different positions by means of a hand lever 51 for arbitrarily varying the speed ratio of the transmission. Slide valve 14 which is again provided with a throttle valve 41 is pivotably connected at its outer end to the control lever 49.

It is one of the laws of infinitely variable cone pulley transmissions that, while at a speed ratio at which the driven side of the transmission runs at a low speed, the ratio between the required contact pressures of the conical disks upon the transmitting element at the driving and driven sides of the transmission is usually the best possible so that the transmitting element is just prevented from slipping, this contact-pressure ratio will decrease to a lower value when the speed ratio is changed toward higher driven speeds while the power input at the driving side remains unchanged, that is in the present case when the speed at the driving side is constant and the torque to be transmitted between the conical disks 3 and 4 and the transmitting element is not changed. This change of the ratio between the contact pressures on the driving and driven sides of the transmission which occurs when the speed ratio of the transmission is changed remains, however, within such small limits that normally it does not have to be considered. There are, however, some occasions in which even this small change of the mentioned ratio is of importance, for example, when very high powers are to be transmitted or when at a predetermined power to be transmitted the transmission should be made of the smallest possible dimensions and when it is therefore of importance that the transmission has the highest possible rate of efficiency so that the stresses upon the individual parts of the transmission and the losses which are caused by wear and excessive heat will be as small as possible. The contact pressures at the driving and driven sides of the transmission should therefore in these cases be produced of such a size that they will not only be responsive to the particular load which is exerted upon the transmission but also the particular speed ratio to which the transmission is adjusted.

These requirements are fulfilled by the transmission as illustrated in FIG. 3 by providing an additional throttle valve 45 which is similar to that as shown in FIG. 2 and is connected in series with the throttle valve 41. The compression spring 48 of this throttle valve 45 may be compressed by being acted upon in response to the particular speed ratio of the transmission by means of a bellcrank 58 one end of which engages into a peripheral groove 57 in the conical disk 4. Thus, the size of the hydraulic pressure at the driven side of the transmission and thus the pressure ratio between the driving and driven sides is not only load-responsive due to the throttle valve 41, but is also determined by the throttle valve 45 in response to the particular speed ratio to which the transmission is adjusted. In this manner it is possible to produce the best possible contact pressures in the transmission as illustrated in FIG. 3, that is, contact pressures which exceed the required minimum values only by a certain safety value.

If a stronger load is exerted upon the driven side of the transmission as shown in FIG. 3, its speed ratio will change toward lower speeds of the driven shaft 2 since the increase in the spreading force of the transmitting element 7 upon the conical disks of the driven side which occurs as the result of the increased load upon this side will act upon the conical disks of the driving side at an approximately equal strength up to twice the strength depending upon the speed ratio as adjusted. The resulting tendency of the conical disk 4 to yield toward the right is then transmitted by the control lever 49 to the slide valve 14 and throttle valve 41 so as to shift the same slightly toward the right. This movement causes the hydraulic pressure in chamber 10 as well as in chamber 11 to be accordingly increased to a value which suffices to counteract the increased spreading force of the transmitting element 7 which is caused by the increased load upon the transmission. Due to the steep characteristic of slide valve 14 as already mentioned and the characteristic of throttle valve 41 which is nearly as steep, this load-responsive change of the hydraulic pressures at both sides of the transmission leads practically to no alteration of the speed ratio of the transmission so that the operation of throttle valve 45 will also not be affected by any influence.

If the transmission is to be arbitrarily adjusted, for example so that the driven shaft 2 will run at a higher speed, hand levers 51 is to be pivoted in the clockwise direction so that at first the end of control lever 49 which is pivotably connected to lever 51 and thus also the slide valve 14 together with throttle valve 41 will be shifted toward the right. This, in turn, causes the hydraulic pressures to be increased in chambers 10 and 11, but in chamber 10 to such a higher value than in chamber 11 that the conical disk 6 will yield toward the right, while disk 4 will be forced toward the left and will thereby take along the end of control lever 49 which engages into its peripheral groove 50. This causes the slide valve 14 to be shifted back toward the left until the transmission is again in a balanced condition but is now adjusted to a speed ratio with a higher driven speed. Control lever 49 has thereby carried out a pivoting movement about an axis which extends approximately through the center of its length, as seen in FIG. 3.

By the above-mentioned change of the speed ratio of the transmission, the conical disk 4 has been moved for such a distance toward the left that by its connection to the bellcrank 58 it has also caused the compression of spring 48 to be reduced with the result that the hydraulic pressure at the driven side of the transmission and at the same time the pressure ratio between both sides of the transmission is changed in response to the change of the speed ratio.

FIG. 4 illustrates a transmission which is again intended primarily for being connected to an engine, for example, of a motor vehicle, the speed and power output of which are variable. This transmission is provided with a throttle valve, designated generally by the numeral 52, the connecting rod of which is pivotably connected directly to the accelerator 26. Since the valve member of this valve 52 is therefore movable for relatively long distances, it is preferably made of a conical shape, the longer conical part 53 of which is adapted to throttle the return flow of the excessive oil coming from the outer control edges of slide valve 15 in accordance with the particular operative position of the accelerator 26 and thus in response to the load to which the transmission is subjected. Since the valve member of throttle valve 52 is directly connected to the accelerator 26, it is, however, necessary to provide it with an additional conical part 54 which is shorter than the conical part 53 and adapted, when the accelerator is retracted beyond its neutral position for decelerating the vehicle by means of the braking action of its engine, to provide for the required hydraulic pressure in chamber 10 at the side of the transmission which is then its driven side. In all other respects, the same applies to the transmission according to FIG. 4 which has previously been stated with reference to the transmissions according to FIGS. 1 and 2.

Each of the transmissions as shown in FIGS. 1, 2 and 4 may also be provided with a control lever in a similar manner as provided in the transmission according to FIG. 3. Furthermore, instead of providing the transmission according to FIG. 3 with the throttle valve 45, it is also possible to provide it with a throttle valve similar to the valve 52 as shown in FIG. 4 in which, however, the conical part 54 may then be omitted.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. An infinitely variable cone pulley transmission having a driving shaft and a driven shaft and two pairs of conical pulley discs mounted one on each of said shafts, at least one endless transmitting element connecting and running between at least said pairs of conical pulley disks, one disk of each pair being movable in the axial direction on its shaft relative to the other disk and forming a rotating hydraulic cylinder containing a piston rigidly connected to said shaft, hydraulic fluid supply means for producing solely the contact pressures with which the conical disks are applied against the transmitting element at both sides of the transmission and in a manner so as to be automatically load-responsive, a control element for maintaining and varying the speed ratio of the transmission, a distributing slide valve having four control edges acted upon by said control element and adapted to distribute the pressure fluid supplied to it from a source to the hydraulic cylinders, a return line for the pressure fluid flowing off past the outer control edges of the slide valve under the pressure prevailing at the driven side of the transmission, a throttle valve in the return line, and means operatively connecting the throttle valve and the slide valve to the control element to be acted upon simultaneously by the control element.

2. A transmission as defined in claim 1, in which the connecting means connect the throttle valve to the slide valve so as to follow the movement of the slide valve.

3. A transmission as defined in claim 1, in which the connecting means positively connects the throttle valve and the slide valve to each other.

4. A transmission as defined in claim 3, in which the slide valve has a housing and the throttle valve comprises a radial bore in the slide valve and an associated radial bore in the housing of the slide valve, said bores being in axial alignment and communicating with each other when the slide valve is in its neutral position.

5. A transmission as defined in claim 4, in which one end of the slide valve is provided with an axial bore which connects with the radial bore of said valve, a pressure relief valve connected to said axial bore, and means connecting said relief valve to the return line of the pressure fluid.

6. A transmission as defined in claim 1, in which the throttle valve is a conical valve.

7. A transmission as defined in claim 6, in which the throttle valve is a double conical valve having a first longer cone for effecting variable throttling actions when the transmission is driven by its normal drive shaft, and having a second shorter cone for effecting the variable throttling action when said drive shaft acts as the driven shaft of the transmission.

8. A transmission as defined in claim 1, in which the throttle valve is a second slide valve having one control edge and opposite end surfaces, the connecting means between the control element and the throttle valve including a spring element acting upon one of the end surfaces, and means to conduct the hydraulic fluid pressure prevailing at the driven side of the transmission to act upon the other end surface.

9. A transmission as defined in claim 1, in which the connecting means comprises means pivotably connecting to the slide valve, said central element serving for varying the speed ratio of the transmission and means operatively connecting the control element to one of the axially movable disks for movement thereby in proportion to the movement of the latter, and in series with the throttle valve, a second throttle valve, and means operatively connecting the second throttle valve to one of the axially movable disks for movement thereby.

10. A transmission as defined in claim 1, in which, when employing a drive unit with a variable speed and a variable power output, a governor which is acted upon by the speed and by the power output of the drive unit as adjusted.

11. A transmission as defined in claim 10, is operatively connected to the slide valve means directly responsive to the power output of the drive unit as adjusted to control said throttle valve.